United States Patent Office 3,696,021
Patented Oct. 3, 1972

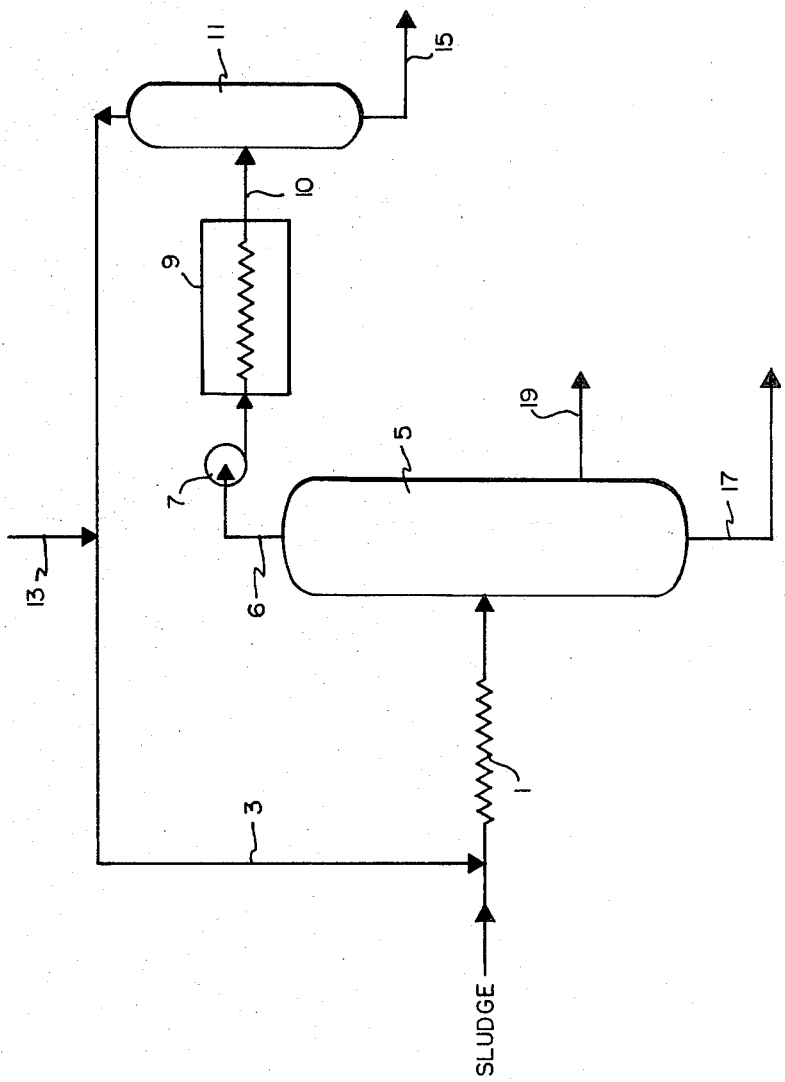

3,696,021
CONTINUOUS PROCESS FOR SEPARATING OILY SLUDGES
Edward L. Cole, Fishkill, and Howard V. Hess, Glenham, N.Y., assignors to Texaco Inc., New York, N.Y.
Filed June 12, 1970, Ser. No. 45,742
Int. Cl. C01g 33/04
U.S. Cl. 208—13                                                        9 Claims

ABSTRACT OF THE DISCLOSURE

Oily sludges are mixed with light hydrocarbons differing substantially in specific gravity therefrom to separate the sludges into an oil-hydrocarbons phase and a water-solids phase. The oil-hydrocarbons phase is heated to a temperature above the critical temperature of the hydrocarbons to remove the light hydrocarbons which are recycled for mixing with additional sludge and the oil is recovered for further use. The water-solids phase is treated to obtain water of reduced Chemical Oxygen Demand which can be discharged in receiving bodies of water without polluting the same. The solids slurried with water which are recovered find utility, inter alia, as land fill.

BACKGROUND OF THE INVENTION

Field of the invention

This invention relates to a continuous process for de-oiling and dewatering refinery sludges by the use of light hydrocarbons followed by settling to give an oil-hydrocarbon phase and a solids-water slurry.

Description of the prior art

The contents of sludges occurring in refineries consist of sediments from the bottom of tanks, waste chemicals, emulsions, sand, clay, catalyst rust generated over sometimes several years as well as water and oil. The varied nature of the contents has made it difficult over the years to economically deoil and dewater them for reuse or pollution-free disposal. Thus the use of both benzene and naphthas with added water in an attempt to deoil sludge was found economically unattractive because the poor settling characteristics of the resulting mass made centrifuging necessary. Similarly attempts to deoil and break sludges of the present type with iso-octane and a gas oil were also not successful because the oil phase and the water-solids phase did not separate.

SUMMARY OF THE INVENTION

It has now been discovered that by contacting refinery sludges with light hydrocarbons it is possible to obtain excellent phase separation with attendant deoiling of the solids and separation of the oil-hydrocarbon from the water-solids phase. The present process does not require centrifuging and settling and decanting to effect separation of the oil-hydrocarbon from the solids-water phase. Light hydrocarbons suitable for the practice of the invention include propane, butane, pentane, as well as mixtures and isomers thereof. The volume ratio of light hydrocarbons to sludge may range from about 3:1 to 20:1, and preferably from about 4:1 to 8:1. The recovered oil is clean and suitable for feeding to a catalytic cracking unit, to a crude still or may be blended in fuel oils. The deoiled solids are suitable for land fill.

Further details of the subject process will become more readily apparent from the following description taken together with the accompanying drawing, the single figure of which is a schematic view illustrating in non-limiting fashion a practical embodiment of the invention.

DETAILED DESCRIPTION OF THE INVENTION

On examining the figure, it will be seen that refinery sludge and light hydrocarbon from line 3 are mixed in mixing area 1 from which they flow into a settling area such as drum 5. Here the mixture of hydrocarbon and oil previously contained in the sludge flows to the top while the water and the solids settle to the bottom. Upon further standing, the water-solids phase separates to give a water-phase and a solids-water slurry. The water which has a considerably reduced Chemical Oxygen Demand (COD) is taken off through line 19 for possible further reduction in COD in a biological section such as an activated sludge tank. The solids-water slurry is taken off through line 17 and may be steamed to remove any trace of light hydrocarbon to give a water-solids slurry that may be placed directly on the land, leaving evaporation to take care of the extra water.

The light hydrocarbon-oil top layer is pumped through line 6 by pump 7 into a heating area such as heater 9 which is sufficiently heated to raise the temperature above the critical temperature of the particular light hydrocarbon which has been used as the separating medium and generally from about 70 to about 120° F. and 10 to about 150 p.s.i.g. to about 275–390° F. While the hydrocarbon is in residence in the heater, sufficient pressure is maintained thereon to keep it in a dense phase, or about 500 to 600 p.s.i.g. Next, the hot light hydrocarbon-oil mixture passes through line 10 into a fractionating area such as tower 11 where an oil phase poor in light hydrocarbon is taken off the bottom through line 15 while a dense phase light hydrocarbon which is oil-poor comes off the top through line 3 for recycling and mixing with fresh sludge after cooling and depressurizing. The oil coming off line 15 is substantially free of light hydrocarbon and can be recycled to other portions of a refinery such as the crude stills or, after stabilization for flash point, can be blended directly with fuel oil. Any light hydrocarbon lost in the process can be made up by addition to the system through line 13.

In the heating and fractionating areas, the operating conditions are as follows in the various light hydrocarbons:

| Light hydrocarbons | Temperature, °F. | Pressure, p.s.i.g. |
|---|---|---|
| n-C$_4$ | 306–320 | 550–600 |
| i-C$_4$ | 275–300 | 550–600 |
| n-C$_5$ | 390–420 | 500–550 |
| i-C$_5$ | 375–400 | 500–550 |
| neo-C$_5$ | 370–400 | 500–550 |

Table I below gives a typical analysis of sludges which can be treated by the process of the invention:

TABLE I

| Sludge | Tank cleaning sludge | Disposal pit sludge |
|---|---|---|
| COD, mg. O$_2$/L | 500,000 | 679,000 |
| Oil, weight percent | 18.4 | 36.4 |
| Water, weight percent D-95 | 49.1 | 40.3 |
| Moisture, weight percent D271 | 51.0 | 36.0 |
| Volatiles, weight percent D271 | 35.0 | 52.0 |
| Ash, weight percent | 14.3 | 8.6 |
| pH | 8.4 | 7.3 |

The following examples are given to illustrate the present invention and to indicate the unexpected effectiveness thereof. It is not intended to limit the present invention to the particular method employed, the concentration of material, the particular sludge composition or the specific conditions of operation employed in presenting these examples.

EXAMPLE I 1600 ml. of n-pentane were placed in separatory funnel and 200 grams disposal pit sludge, gravity 1.0 gram/ml. were added. After vigorously shaking, two phases appeared to separate completely in 1 hour. The top phase 908 grams was decanted clear from slurry bottoms, which amounted to 404 grams. The n-pentane was evaporated from top layer. Bottom layer filtered very slowly and the filter cake dried on a steam plate. The following was noted:

| Sample | 15A, stripped top layer | 15C, dry sludge layer |
|---|---|---|
| Weight, grams | 62 | 44 |
| Yield, weight percent, basis charge | 31 | 22 |
| Carbon, weight percent | | 43.1 |
| Ash, weight percent | | 35.0 |
| Sulfur, weight percent | | 4.8 |
| Specific gravity, 60/60° F | 0.9234 | |
| Free carbon, weight percent | | 35.4 |
| Remarks | | (1) |

[1] Free flowing powder.

EXAMPLE II 1000 ml. of n-pentane were placed in separatory funnel and 200 grams of refinery disposal pit sludge, gravity 1.0 gram/ml. were added. The whole was shaken vigorously. Phases separated in about 1 hour. A clear top layer, 599 grams, was decanted from the slurry bottoms. The bottoms were filtered at a very slow rate and the filter cake was dried on a steam plate. The following was noted:

| Sample | Stripped top layer | Dry sludge layer |
|---|---|---|
| Sample, weight grams | 66 | 47 |
| Sample Number | 16A | 16C |
| Yield, weight percent, basis charge | 33 | 23.5 |
| Specific gravity, 60/60° F | 0.9305 | |
| Carbon, weight percent | | 47.4 |
| Ash, weight percent | | 32.8 |
| Viscosity kin. 100° F. (cs.) | 81.8 | |
| Free carbon, weight percent | | 33.8 |

EXAMPLE III 1600 ml. n-pentane were placed in a separatory funnel and 200 grams refinery disposal pit sludge were added, shaken vigorously and allowed to settle overnight. The top layer was decanted and n-pentane was evaporated. The bottom phase was filtered under vacum. The filter cake was dried on a steam plate. The following was noted:

| Sample | Top layer | Bottom layer |
|---|---|---|
| Sample Number | 36A | 36C |
| Product, weight grams | 63 | 43 |
| Yield, weight percent, basis charge | 31.5 | 21.5 |
| Specific gravity, 60/60° F | 0.9317 | |
| Kin. viscosity 100° F. (cs.) | 87.7 | |
| Carbon, weight percent | | 49.0 |
| Ash, weight percent | | 34.3 |

EXAMPLE IV 1600 ml. of n-pentane were placed in a separatory funnel and 200 grams of disposal pit sludge were added, shaken vigorously and allowed to settle. The phases separated well and were allowed to settle overnight. The top layer was decanted from the bottom phase. A top layer weighing 573 grams was recovered and a bottom layer weighing 610 grams was recovered.

| Sample | Top layer | Bottom layer |
|---|---|---|
| Pentane free, weight grams | 74 | 120 |
| Water free, weight grams | 74 | 54 |
| Weight percent basis charge | 37 | 27 |
| Sample Number | 47A | 47C |
| Specific gravity 60/60° F | 0.9050 | |
| Kin. viscosity 100° F. (cs.) | | |
| Carbon, weight percent | | 50.2 |
| Ash, weight percent | | 30.1 |

EXAMPLE V 1600 ml. n-pentane were placed in a separatory funnel and added to 200 grams of disposal pit sludge. The mixture was shaken vigorously and allowed to settle. The phases separated well and were allowed to settle overnight. The top layer was decanted from the bottom phase. There were recovered 917 grams of top layer and 248 grams of bottom layer. n-Pentane and any water from both layers were evaporated.

| Sample | Top layer | Bottom layer |
|---|---|---|
| Pentane and water free, grams | 62 | 55 |
| Yield weight percent (basis charge) | 31 | 27.5 |
| Sample | 63A | 63C |
| Specific gravity, 60/60° F | 0.9400 | |
| Sulfur, weight percent | 0.77 | 4.2 |
| Ash, weight percent | | 31.6 |
| Carbon, weight percent | | 49.7 |

The data in Examples I-V is summarized in Table II below:

TABLE II.—SUMMARY—DEOILING, DEWATERING OF DISPOSAL PIT SLUDGE

| | Run | | | | |
|---|---|---|---|---|---|
| | 15 | 16 | 36 | 47 | 63 |
| Example | I | II | III | IV | V |
| Hydrocarbon | (1) | | | | |
| Hydrocarbon: sludge | 8:5 | 5:1 | 8:1 | 8:1 | 8:1 |
| Treat temperature, °F | ca. 75 | 75 | | | |
| Treatment | (2) | (2) | (3) | (3) | (3) |
| Yield, weight percent: | | | | | |
| Oil | 31 | 33 | 31.5 | 37 | 31 |
| Solids | 22 | 23.5 | 21.5 | 27 | 27.5 |
| Nature of solids: | | | | | |
| Carbon, weight percent | 43.1 | 47.4 | 49.3 | 50.2 | 49.7 |
| Sulfur, weight percent | 4.8 | | | | 4.2 |
| Ash, weight percent | 35.0 | 32.8 | 34.0 | 30.1 | 31.6 |
| Free carbon, weight percent | 35.4 | 33.8 | | | |
| Remarks | (4) | (4) | (4) | (4) | (4) |
| Nature of oil: | | | | | |
| Specific gravity 60/60° F | 0.9234 | 0.9305 | 0.9317 | 0.9050 | 0.9400 |
| Vis. kin. 100° F. (c.s) | | 81.8 | 87.7 | | |
| Sulfur, weight percent | | | | | 0.77 |

[1] n-Pentane.
[2] Decanted clear top layer, vacuum filtered bottom layer to separate solids from water. Both freed of $C_5$ + $H_2O$ on steam plate.
[3] Decanted clear top layer. Both layers freed of $C_5$ and water on steam plate.
[4] Free flowing and not oily.

In the examples shown, the oil-n-pentane mixture was decanted from the solids-water phase, however, in Examples I-III the bottom phase was filtered to separate the solids from the water prior to drying while in Examples IV-V the bottom phase was merely dried on a steam plate.

The recovered oil is clean and suitable for incorporation in feed to the catalytic cracker, the crude stills, or may be blended in fuel oils. The recovered solids are dark grey and comprised in Example V of 49.7 percent total carbon, 31.6 percent ash and 4.2 percent sulfur. The high carbon content was largely due to free carbon (benzene insolubles) such as coke, both particulate and the incorporated in the inorganic portions as carbon on a catalyst. The benzene solubles largely comprise asphaltene type compounds that when dry are free flowing coke like.

The deoiled solids are not oily to the touch, and after drying are free flowing. They are suitable for land fill as unlike the sludge they do not contaminate adjacent areas with oils as water-oil emulsions.

The recovery of about 32 percent oil makes it appear that the oil recovered may be sufficient to pay for the process and make it profitable.

Example VI below covers the deoiling of tank cleaning sludge, using n-pentane. It will be noted that 19 percent oil was recovered compared to 18.4 percent determined analytically. The sludge solids recovered was dry, free flowing and not oily. The sample contained 25.1 percent free carbon compared to 26.3 percent total carbon, another indication of the non-oily character of the solids.

EXAMPLE VI 1000 ml. n-pentane were placed in a separatory funnel and 200 grams of tank cleaning sludge were added and shaken vigorously. The phases separated completely in 1.5 hours. A clear top layer was decanted from the slurry bottoms. Top and bottom phases were placed on a steam plate to evaporate n-pentane and water from the two phases.

| Sample | 13A, stripped top layer | 13B, dry sludge layer |
|---|---|---|
| Weight grams | 38 | 44 |
| Yield, weight percent | 19 | 22 |
| Specific gravity 60/60° F | 0.9582 | |
| Carbon, weight percent | 79.3 | 26.3 |
| Ash, weight percent | | 55.7 |
| Sulfur, weight percent | 0.87 | 3.7 |
| Free carbon, weight percent | | 25.1 |
| Remarks | | (¹) |

¹ Free flowing powder.

EXAMPLE VII

This example describes the settling characteristics of 86 ml. n-pentane with 15 ml. of disposal pit sludge that had been thoroughly mixed. The data collected show that excellent settling was secured in two hours while phase separation was substantially complete in 24 hours.

| Settling time | Clear top oil layer, ml. | Bottom sludge water layer, ml. |
|---|---|---|
| Minutes: | | |
| 0 | 0 | 100 |
| 5 | 10 | 90 |
| 35 | 65 | 35 |
| 75 | 70 | 30 |
| 115 | 73 | 27 |
| Hours: | | |
| 18 | 76 | 24 |
| 24 | 77 | 23 |
| 72 | 78 | 22 |

EXAMPLE VIII

This example shows that the separation is purely physical and the charge constituents retain their individual characteristic during processing.

1600 n-pentane and 200 grams of disposal pit sludge were shaken together in a 200 ml. graduate for ½ hour and settled overnight. The top and bottom layer separated. 63 grams of oil were recovered from the top layer and 62 grams of solids from the bottom layer by stripping layers on steam plate.

83 ml. of deionized water were mixed with 62 grams of solids and then added to the oil (63 grams) that had been recovered. The mixture was then shaken. An emulsion resulted that resembled the charge sludge.

EXAMPLE IX

This example presents data on the multiple contacting of disposal pit sludge with n-pentane and shows that a staged operation is effective for deoiling the sludge.

1200 ml. n-pentane were placed in a 2000 ml. stoppered graduate and 400 grams of disposal pit sludge were added, shaken vigorously for ½ hour and allowed to settle for 18 hours. A 920 ml. clear top layer was decanted from a 520 ml. bottom sludge layer. The top layer was stripped to recover 108 grams of oil, or 27.0 weight percent of the charge.

The bottom layer was contacted with 1200 ml. fresh n-pentane, shaken for ½ hour and allowed to settle 4 hours. A 1095 ml. top layer was recovered and a 655 ml. bottom layer. Both layers were freed of n-pentane and water. 12 grams of oil were recovered which were composited with oil from the first stage. The solids were dry and free flowing.

| Sample | Oil | Solids |
|---|---|---|
| Total weight grams | 120 | 137 |
| Yield, weight percent | 30.0 | 34.1 |
| Sample number | 96A | 96B |
| Specific gravity 60/60° F | 0.9281 | |
| Kin. viscosity at 100° F, (cs.) | 397 | |
| Carbon residue, percent | 2.27 | |
| Sulfur, weight percent | 0.55 | |
| Carbon, weight percent | | 46.6 |
| Ash, weight percent | | 26.6 |
| Remarks | | (¹) |

¹ Free flowing.

EXAMPLE X

This example presents work done on a low oil content sludge from the bottom of a reservoir using n-pentane. The sludge had the following analysis:

Ash, wt. percent _____ 4.9
Carbon, wt. percent _____ 15.5
Sulfur, wt. percent _____ 0.20
Nitrogen, wt. percent _____ 0.08
Total volatiles, percent _____ 95.1

130 grams of bottom sludge were placed in a 2000 ml. stoppered graduate with 650 ml. of n-pentane, shaken for ½ hour and allowed to settle overnight. A top layer, 390 ml. and a bottom layer, 350 ml. were decanted. The top layer, 205 grams, was stripped free of n-pentane on a steam plate, and 9.0 grams of oil were recovered. The bottom layer, 236 grams, was stripped free of n-pentane and water on a steam plate and 9.0 grams solids were recovered.

| Sample | Stripped top layer | Dry sludge layer |
|---|---|---|
| Sample Number | 93A | 93B |
| Specific gravity, 60/60° F | 0.9173 | (¹) |

¹ Free flowing.

5 grams of Sample 93B were mixed with 100 ml. benzene. After filtering and stripping the following were observed:

| | Stripped filtrate | Stripped solids |
|---|---|---|
| Sample, weight grams | 0.02 | 4.6 |
| Sample Number | | 93B1 |
| Carbon, weight percent | | 10.7 |
| Ash, weight percent | | 80.1 |
| Remarks | | (¹) |

¹ Free flowing.

EXAMPLE XI

Eighty grams of disposal pit sludge were placed in a bomb constructed of a 1½" x 18" length of pipe fitted with caps, pressure gauge and draw-off taps. Next 237 g. of i-butane were added. The pipe was sealed and shaken for 1 hour before the contents were allowed to settle overnight. The i-butane-oil top layer was drawn off from a side tap and a layer containing the solids-water was recovered. Isobutane was distilled off from both layers by heating the layers on a steam plate.

An oil having an API viscosity of 22.6 was recovered from the top layer and solids representing 41.2% of the charge were recovered from the dried bottom layer. The solids had an ash content of 21.6%.

Thus a practical embodiment of the subject process also includes the distillation of the light hydrocarbons from both the separated oil-light hydrocarbon phase and the water-sludge phase as a means of separating the light hydrocarbons.

Although certain embodiments of the invention have been set forth in detail, the present invention is not in any way limited to these embodiments and suitable modifications can be made therefrom without departing from the scope of the invention.

What is claimed is:

1. A process for deoiling and dewatering sludges which comprises mixing said sludges with a light hydrocarbon having at least four carbon atoms; allowing the resulting mixture to settle, separating said mixture into water having a reduced Chemical Oxygen Demand, a solids-water phase and an oil-hydrocarbon phase, heating said last phase to a temperature above the critical temperature of said hydrocarbon in the range of 300° to 420° F. under a pressure ranging from 500 to 600 p.s.i.g. sufficient to keep said hydrocarbon in a dense phase whereby said phase is split into a hydrocarbon portion and an oil portion and recovering said last mentioned portions.

2. A continuous process as defined in claim 1, wherein said hydrocarbon is distilled from both the solids-water phase and the oil-hydrocarbon phase and recycled for mixing with additional sludge.

3. The continuous process as defined in claim 2 wherein additional light hydrocarbons are added to the recycled hydrocarbon.

4. The process as defined in claim 1 wherein said hydrocarbons are butane, pentane or mixtures or isomers thereof.

5. The process as defined in claim 1 wherein the volume ratio of hydrocarbon to sludge ranges from about 3:1 to about 20:1.

6. The process as defined in claim 1 wherein the volume ratio of hydrocarbon to sludge ranges from about 4:1 to about 8:1.

7. The process as defined in claim 1 wherein said light hydrocarbon is distilled from said oil-hydrocarbon phase and said solids-water phase.

8. The process as defined in claim 1, wherein said hydrocarbon is n-pentane and said oil-hydrocarbon phase is heated to between 390° and 420° F. under a pressure of between 500 and 550 p.s.i.g.

9. The process as defined in claim 1, wherein said hydrocarbon is i-butane and said oil-hydrocarbon layer is heated to between 275° and 300° F. under a pressure of 550 to 600 p.s.i.g.

References Cited

UNITED STATES PATENTS

| | | | |
|---|---|---|---|
| 2,235,639 | 3/1941 | Koch | 208—188 |
| 2,730,240 | 1/1956 | Johnson | 208—188 |
| 2,383,363 | 8/1945 | Batchelder | 208—188 |

HERBERT LEVINE, Primary Examiner

U.S. Cl. X.R.

208—188